(12) United States Patent
Velan et al.

(10) Patent No.: US 10,852,077 B2
(45) Date of Patent: Dec. 1, 2020

(54) HEAT EXCHANGER WITH HEAT TRANSFERRING LAYER

(71) Applicant: ECODRAIN INC., Montreal (CA)

(72) Inventors: David Velan, Montreal (CA); Karim Marnissi, Ville de Saint Catherine (CA)

(73) Assignee: ECODRAIN INC., Montreal (CA)

( * ) Notice: Subject to any disclaimer, the term of this patent is extended or adjusted under 35 U.S.C. 154(b) by 84 days.

(21) Appl. No.: 16/250,077

(22) Filed: Jan. 17, 2019

(65) Prior Publication Data

US 2019/0219347 A1 Jul. 18, 2019

Related U.S. Application Data

(60) Provisional application No. 62/618,342, filed on Jan. 17, 2018.

(51) Int. Cl.
| | |
|---|---|
| *F28F 21/08* | (2006.01) |
| *F28F 1/10* | (2006.01) |
| *F28D 7/00* | (2006.01) |
| *F28D 21/00* | (2006.01) |
| *F28F 13/18* | (2006.01) |
| *F28F 9/02* | (2006.01) |
| *F28F 9/18* | (2006.01) |

(Continued)

(52) U.S. Cl.
CPC .......... *F28F 21/085* (2013.01); *F28D 7/0008* (2013.01); *F28D 7/0025* (2013.01); *F28D 7/0033* (2013.01); *F28D 21/0012* (2013.01); *F28F 1/10* (2013.01); *F28F 13/18* (2013.01); *F28F 9/0246* (2013.01); *F28F 9/04* (2013.01); *F28F 9/185* (2013.01); *F28F 2013/006* (2013.01); *F28F 2245/00* (2013.01); *F28F 2275/04* (2013.01)

(58) Field of Classification Search
CPC .... F28D 7/0008; F28D 7/0025; F28D 7/0033; F28D 21/0012; F28F 21/085; F28F 1/10; F28F 13/18
See application file for complete search history.

(56) References Cited

U.S. PATENT DOCUMENTS

| | | | |
|---|---|---|---|
| 813,918 A * | 2/1906 | Schmitz | F28D 7/106 165/141 |
| 4,369,217 A * | 1/1983 | Leistritz | F02F 7/007 123/195 R |

(Continued)

*Primary Examiner* — Jon T. Schermerhorn, Jr.
(74) *Attorney, Agent, or Firm* — Norton Rose Fulbright Canada LLP

(57) ABSTRACT

There is disclosed a heat exchanger extending along a longitudinal axis, including a first conduit configured for circulating a first fluid; a second conduit configured for circulating a second fluid; and a heat transferring layer disposed between the first conduit and the second conduit. The heat transferring layer is monolithic with the second conduit. An abutting side of the heat transferring layer is in contact with the first conduit to define a surface contact interface therebetween. The abutting side is shaped to correspond to a shape of a surface of the first conduit in contact with the heat transferring layer. A thermal resistance defined between the second conduit and the heat transferring layer being less than that across the surface contact interface. The first conduit is in heat exchange relationship with the second conduit via the heat transferring layer.

14 Claims, 6 Drawing Sheets

(51) Int. Cl.
*F28F 9/04* (2006.01)
*F28F 13/00* (2006.01)

(56) References Cited

U.S. PATENT DOCUMENTS

| | | | | |
|---|---|---|---|---|
| 5,343,738 | A * | 9/1994 | Skaggs | F16L 11/121 138/113 |
| 5,433,252 | A * | 7/1995 | Wolf | F16L 7/00 138/111 |
| 5,881,775 | A * | 3/1999 | Owen | F16L 9/10 138/149 |
| 7,770,602 | B2 * | 8/2010 | Buschhoff | F16L 9/18 138/114 |
| 9,982,954 | B1 * | 5/2018 | Jarmon | F28D 7/103 |
| 2001/0042385 | A1 * | 11/2001 | Kaindl | F28D 7/0041 62/436 |
| 2008/0017361 | A1 * | 1/2008 | Van Decker | F28D 7/0016 165/156 |
| 2009/0056919 | A1 * | 3/2009 | Hoffman | F28D 7/0008 165/109.1 |

* cited by examiner

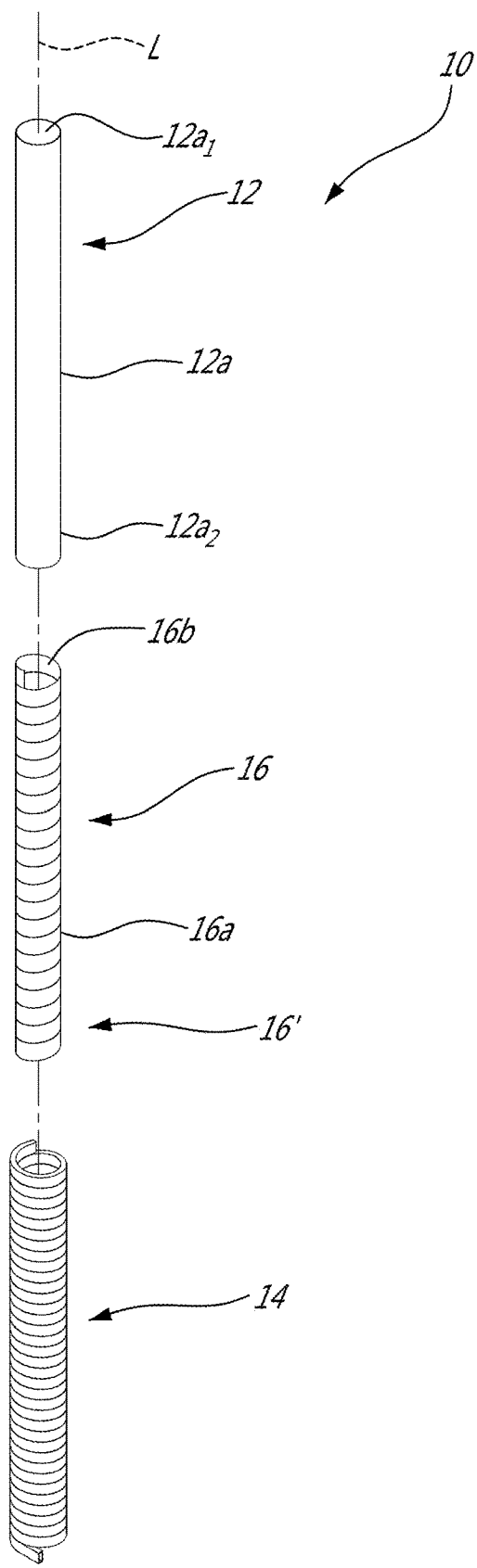

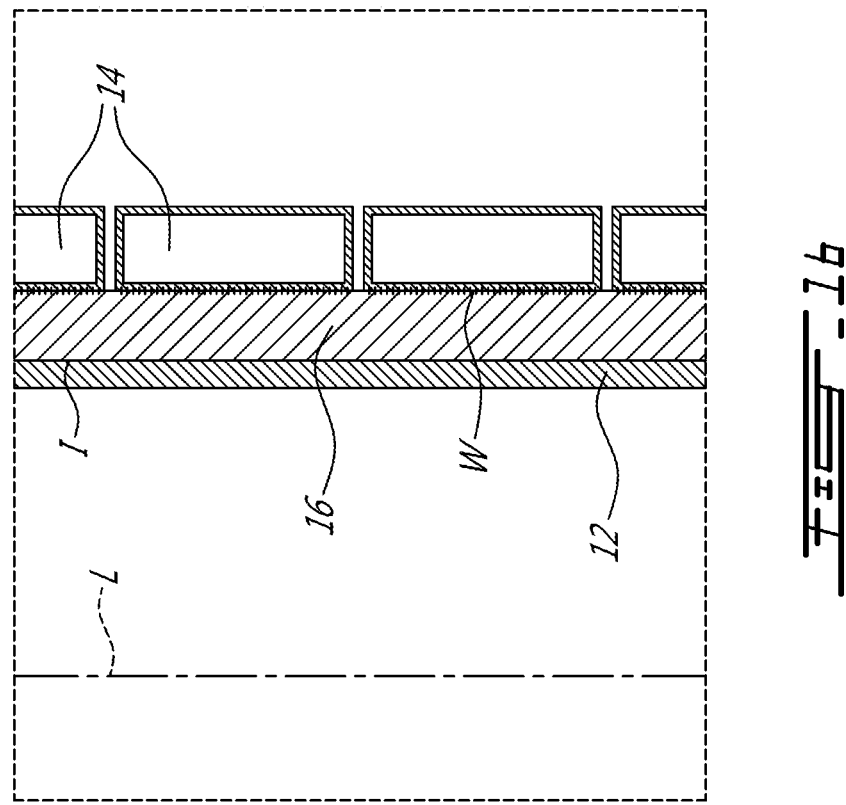
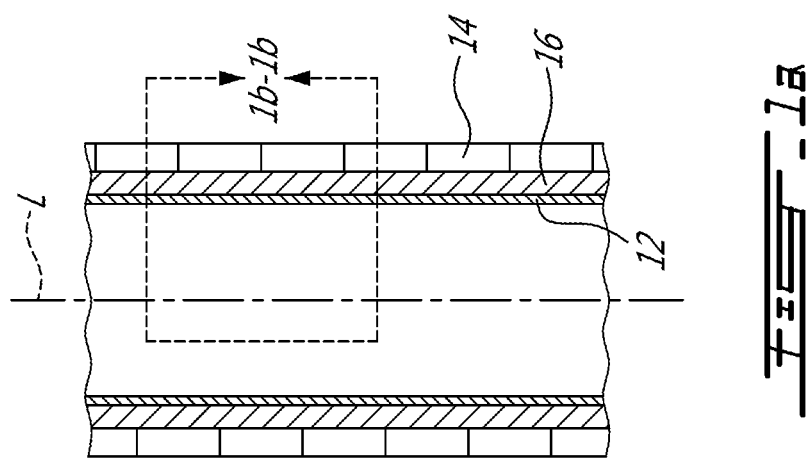

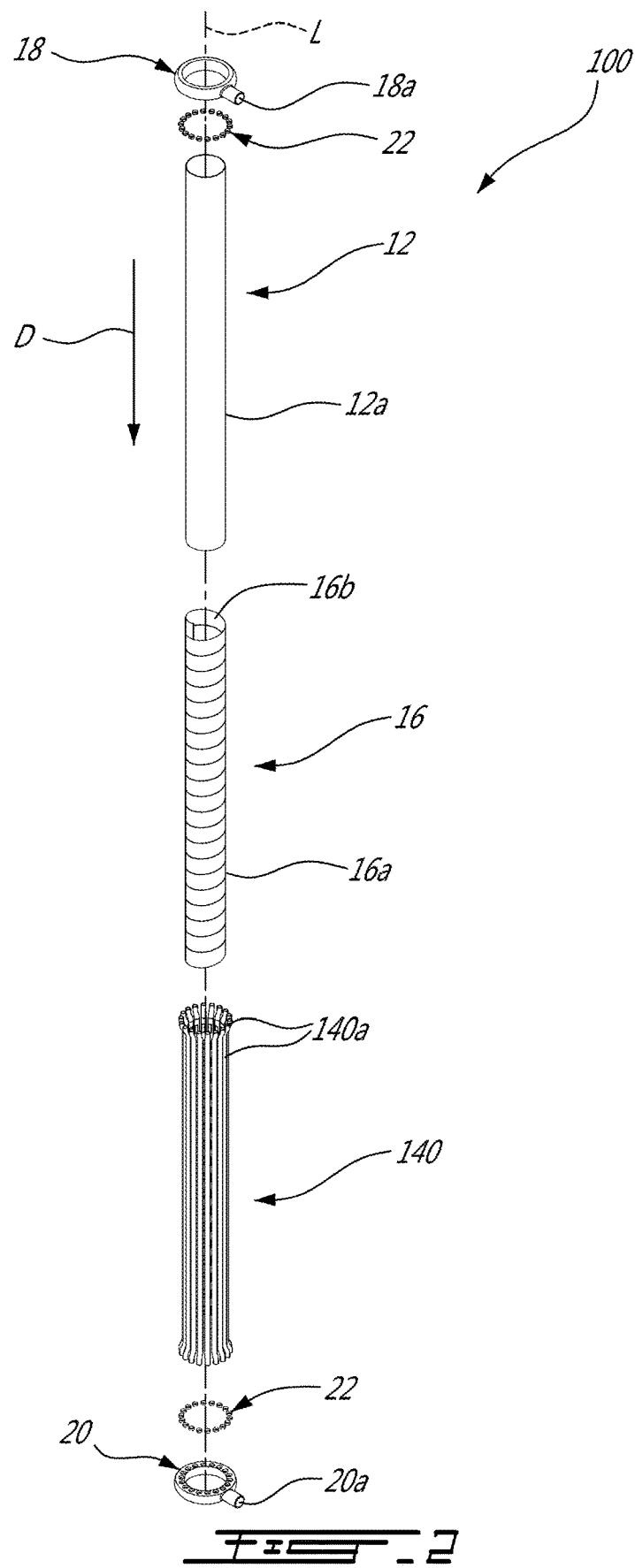

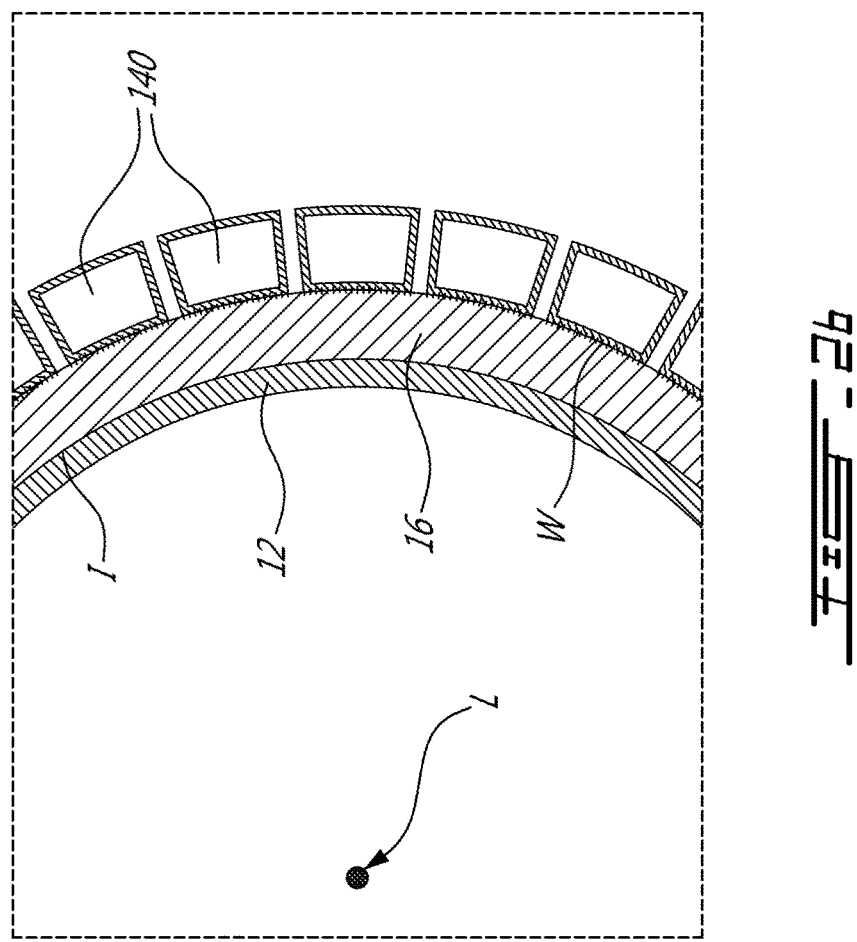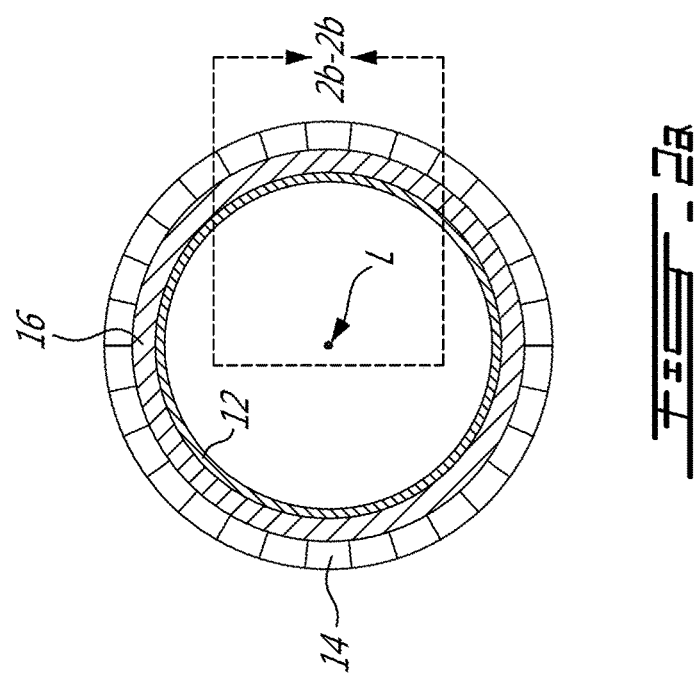

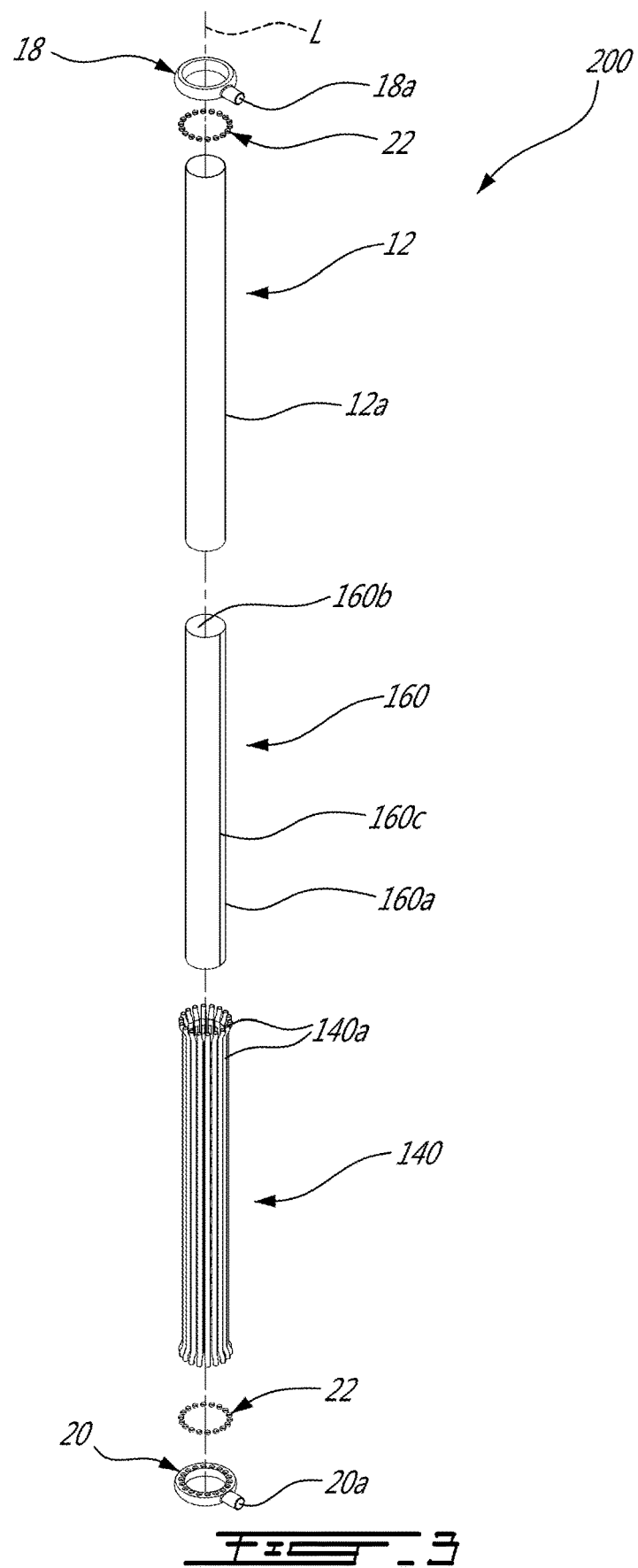

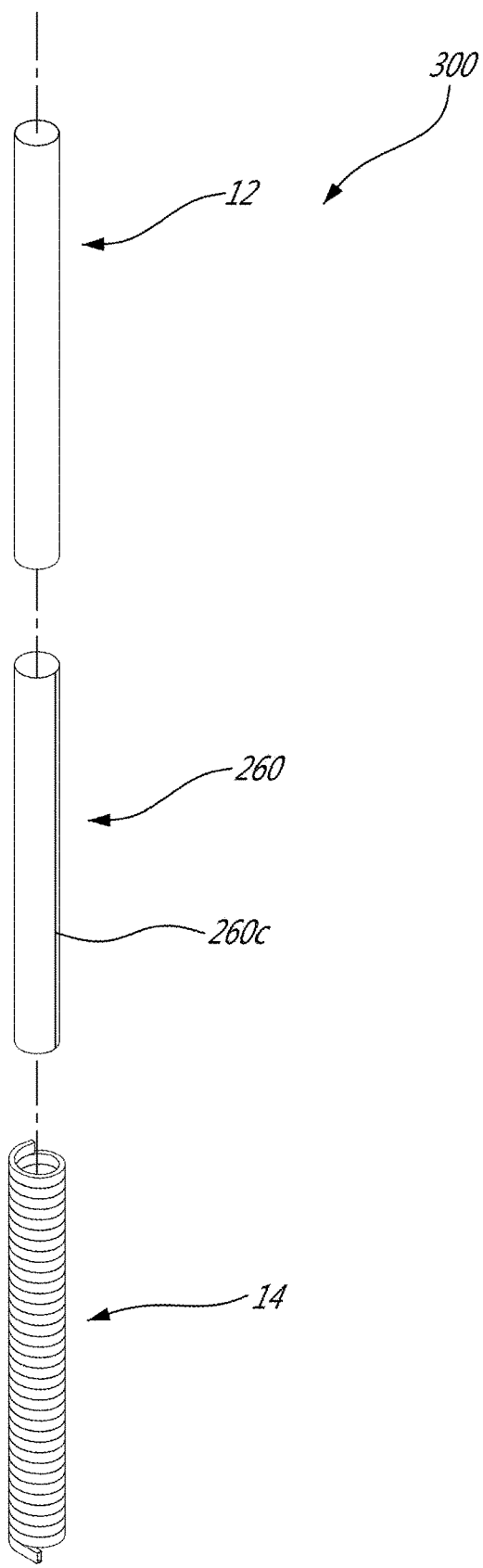

HEAT EXCHANGER WITH HEAT TRANSFERRING LAYER

CROSS-REFERENCE TO RELATED APPLICATION

The present application claims priority on U.S. Patent Application No. 62/618,342 filed Jan. 17, 2018, the entire contents of which are incorporated by reference herein.

TECHNICAL FIELD

The application relates generally to fluid conduits and, more particularly, to heat exchangers.

BACKGROUND OF THE ART

Heated water is often rejected to the surrounding environment while still warm and thus becomes waste water. The heat in the waste water often has economic value, as it can be used to heat another fluid and save on heating costs.

One of the primary challenges of maximizing efficiency of heat transfer is maximizing the contact between the mating surfaces. Solder is known to improve thermal efficiency in some cases by filling the small air gaps between the mating surfaces. However, some governmental regulations (e.g., CSA B55) do not allow for any solder directly in the space between walls of some heat exchangers.

In double-wall heat exchangers, metal to metal contact, between a first conduit that carries a first fluid and a second conduit carrying a second fluid, must be maximized in order to maximize heat transfer efficiency. However, maximizing contact between a series of tubes and a central conduit, for example, is difficult to achieve in practice due to manufacturing limitations, such as limits of tube forming processes, surface imperfections, and roundness tolerances of the tubes, for example.

SUMMARY

There is accordingly provided a heat exchanger, comprising a first conduit configured for circulating a first fluid; a second conduit configured for circulating a second fluid; and a heat transferring layer disposed between the first conduit and the second conduit, the heat transferring layer defining a bonding side and an abutting side, the abutting side being shaped to correspond to a shape of a wall of the first conduit such that the heat transferring layer defines a direct abutment contact against the first conduit, the bonding side of the heat transferring layer being bonded to the second conduit, the first conduit in heat exchange relationship with the second conduit via the heat transferring layer.

There is also provided a heat exchanger, comprising a first conduit configured for circulating a first fluid, a wall of the first conduit having a first side configured for being in contact with the first fluid during use and a second side; a second conduit configured for circulating a second fluid; and a heat transferring layer disposed between the first conduit and the second conduit, the heat transferring layer defining an abutting side and a bonding side, the abutting side of the heat transferring layer being biased against the second side of the first conduit such that the heat transferring layer defines a direct abutment contact against the first conduit, the bonding side of the heat transferring layer being bonded to the second conduit, the first conduit in heat exchange relationship with the second conduit via the heat transferring layer.

There is further provided a method of manufacturing a heat exchanger, the heat exchanger including a first conduit and a second conduit each configured for carrying a fluid, the method comprising: disposing a heat transferring layer against the first conduit such that one of opposed sides of the heat transferring layer defines a direct abutment contact with the first conduit; and bonding the second conduit to the other of the opposed sides of the heat transferring layer such that the first and second conduits are in heat exchange relationship via the heat transferring layer.

In one aspect, there is provided a heat exchanger extending along a longitudinal axis, comprising a first conduit configured for circulating a first fluid; a second conduit configured for circulating a second fluid; and a heat transferring layer disposed between the first conduit and the second conduit, the heat transferring layer being monolithic with the second conduit, an abutting side of the heat transferring layer in contact with the first conduit to define a surface contact interface therebetween, the abutting side shaped to correspond to a shape of a surface of the first conduit in contact with the heat transferring layer, a thermal resistance defined between the second conduit and the heat transferring layer being less than that across the surface contact interface between the heat transferring layer and the first conduit, the first conduit in heat exchange relationship with the second conduit via the heat transferring layer.

In another aspect, there is provided a heat exchanger extending along a longitudinal axis, comprising a first conduit configured for circulating a first fluid; a second conduit configured for circulating a second fluid; and a heat transferring layer disposed between the first conduit and the second conduit, the heat transferring layer being monolithic with the second conduit, an abutting side of the heat transferring layer in contact with the first conduit to define a surface contact interface therebetween, the abutting side shaped to correspond to a shape of a surface of the first conduit in contact with the heat transferring layer, wherein an area of the surface contact interface is greater than a reference area, the reference area corresponding to an area of a reference surface contact interface between the second conduit and the first conduit if the second conduit were in direct contact with the first conduit without the heat transferring layer being present, the first conduit in heat exchange relationship with the second conduit via the heat transferring layer.

In yet another aspect, there is provided a method of manufacturing a heat exchanger, the heat exchanger including a first conduit and a second conduit each configured for carrying a fluid, the method comprising: disposing a heat transferring layer against the first conduit to create a surface contact interface between the heat transferring layer and the first conduit; and bonding the second conduit to a surface of the heat transferring layer facing away from the first conduit such that the heat transferring layer is monolithic with the second conduit, wherein a thermal resistance defined between the second conduit and the heat transferring layer is less than that across the surface contact interface between the heat transferring layer and the first conduit.

BRIEF DESCRIPTION OF THE DRAWINGS

Reference is now made to the accompanying figures in which:

FIG. 1 is a schematic three dimensional exploded view of a heat exchanger in accordance with one embodiment;

FIG. 1a is a schematic cross-sectional view taken along a plane containing a longitudinal axis of the heat exchanger of FIG. 1 being assembled;

FIG. 1b is an enlarged view of zone 1b-1b on FIG. 1a;

FIG. 2 is a schematic three dimensional exploded view of a heat exchanger in accordance with another embodiment;

FIG. 2a is a cross sectional view taken on a plane normal to a longitudinal axis of the heat exchanger of FIG. 2 being assembled;

FIG. 2b is an enlarged view of zone 2b-2b on FIG. 2a;

FIG. 3 is a schematic three dimensional exploded view of a heat exchanger in accordance with yet another embodiment; and FIG. 4 is a schematic three dimensional exploded view of a heat exchanger in accordance with yet another embodiment.

DETAILED DESCRIPTION

Referring now to FIGS. 1, 1a, and 1b, a heat exchanger is shown at 10. The heat exchanger 10 includes a first conduit 12 configured for circulating a first fluid and a second conduit 14 configured for circulating a second fluid. The heat exchanger 10 is configured to allow the first fluid to exchange heat with the second fluid.

Technically, it would be possible to directly bond (e.g., braze, solder, weld) the first conduit 12 to the second conduit 14. However, this might be precluded by some regulations. Simply disposing the second conduit 14 in close proximity to the first conduit 12 might allow the first fluid to exchange heat with the second fluid via a contact between the two conduits 12, 14. However, air gaps of varying dimensions will remain between the two conduits 12, 14. These air gaps create a thermal contact resistance and are typically the result of surface imperfections of the conduits and/or manufacturing tolerances. Therefore, less heat is transferred between the first and second fluids 12, 14 at locations corresponding to the air gaps compared to other locations where there is no air gap or where the air gaps are smaller.

The air gaps might be minimized by using an intermediate layer between the first and second conduit 12, 14. This intermediate layer is referred to herein as a heat transferring layer 16. The heat transferring layer 16 is made of a material that has a high thermal conductivity such as, for instance, copper. It is understood that any suitable material may be used. The materials of both the first and second conduits 12, 14 and of the heat transferring layer 16 are characterized by a high thermal conductivity. In the embodiment shown, the conduits 12, 14, and the heat transferring layer 16 are made of copper.

The heat transferring layer 16 defines two opposed sides referred to herein as a bonding side 16a and an abutting side 16b. The abutting side 16b of the heat transferring layer 16 is shaped to correspond to a shape of the first conduit 12 such as to define a direct abutment contact, also referred to as a surface contact interface I (FIG. 1b), between the first conduit 12 and the heat transferring layer 16. More specifically, the first conduit 12 has a wall 12a having an internal surface, also referred to as first side $12a_1$ and an external surface, also referred to as second side $12a_2$. The first side $12a_1$ is configured for being in contact with the fluid circulating in the first conduit 12. The heat transferring layer 16 is in direct contact with the second side $12a_2$ of the wall 12a. The first conduit 12 is in heat exchange relationship with the second conduit 14 via the heat transferring layer 16.

The bonding side 16a of the heat transferring layer 16 is bonded to the second conduit 14. In other words, the heat transferring layer 16 is monolithic with the second conduit 14. Herein, "monolithic" means that two pieces are bonded together using any suitable bonding process such that they become a single piece. The bonding process may be, for instance, welding, soldering, or brazing. By becoming monolithic, there may be a continuity of material at an interface between the two conduit. In other words, following the bonding process, the two pieces are blended together at their interface. Herein, bonding means that the heat transferring layer 16 and the second conduit 14 are joined together so that they might become non-dissociable.

As shown in FIG. 1b, the second conduit 14 is welded to the heat transferring layer 16 and a joint line, or weld line, W is disposed between the second conduit 14 and the heat transferring layer 16. A thermal resistance defined between the second conduit 14 and the heat transferring layer 16 might be less than that across the surface contact interface I between the heat transferring layer 16 and the first conduit 12. This might be explain by the fact that heat crossing the surface contact interface I must cross small air gaps created by the roughness of both the heat transferring layer 16 and the first conduit 12. Such air gaps would be present between the second conduit 14 and the heat transferring layer 16 if the joint line I were not present. The joint line I has for effect for filling those air gaps with a material having a higher thermal conductivity than air.

In the embodiment shown, a tight fit engagement is created between the heat transferring layer 16 and the second side $12a_2$ of the wall 12a of the first conduit 12 such that the abutting side 16b of the heat transferring layer 16 is biased against the first conduit 12. In other words, the direct abutment contact means that the heat transferring layer 16 is tightly fitted against the first conduit 12 to be in close proximity to the first conduit 12, but without being bonded or joined to the first conduit 12. This might provide for a lower contact thermal resistance compared to configuration in which the layer 16 is not tightly fitted, or biased, against the first conduit 12.

In the embodiment shown, the second conduit 14 is soldered to the heat transferring layer 16 such that the heat transfer between the heat transferring layer 16 and the second conduit 14 might be maximized while the contact between the heat transferring layer 16 and the first conduit 12 remains a metal to metal contact with an air gap smaller than an air gap that would exist between the first and second conduits 12, 14 without using the heat transferring layer 16. Stated otherwise, dimensions of air pockets between the heat transferring layer and the second side $12a_2$ of the wall 12a might be smaller than that of air pockets between the first and second conduits 12, 14 without the heat transferring layer 16. Therefore, the heat transfer between the two fluids circulating within the conduits 12, 14 might be improved compared to a configuration where the second conduit 14 is in direct contact with the first conduit 12 without being bonded thereto.

In other words, an area of the surface contact interface I between the first conduit 12 and the heat transferring layer 16 is less than a projection of the heat transferring layer on the first conduit 12. This is the case because, at a microscopic level, the surfaces of both the first conduit 12 and the heat transferring layer 16 are rough and define a plurality of crests and valleys. Therefore, a contact between the heat transferring layer 16 and the first conduit 12 corresponds to a sum of a plurality of contacts between crests and valleys of the surface of the first conduit 12 and crests and valleys of the surface of the heat transferring layer. As aforementioned, air gaps are located between all of these contacts.

In the embodiment shown, an area of the surface contact interface I between the heat transferring layer 16 and the first conduit 12 is greater than a reference area. The reference area corresponds to an area of a reference surface contact interface between the second conduit 14 and the first conduit 12 if the second conduit 14 were in direct contact with the first conduit 12 without the heat transferring layer 16 being present. In other words, the heat transferring layer 16 might allow for a better contact with the first conduit 12 than would the second conduit 14 if the heat transferring layer 16 were not present.

Still referring to FIGS. 1, 1a, and 1b, the heat transferring layer 16 is provided in the form of a strip of material 16' that is coiled to have a tube-shape. More specifically, the strip of material 16' is wrapped around the first conduit 12, which is cylindrical in the depicted embodiment, such that a tight contact is created between the heat transferring layer 16 and the first conduit 12. The strip 16' may be of any suitable length and width. A thickness of the strip 16' is selected such that the strip is able to follow a shape of the first conduit 12 while allowing the second conduit 14 to be bonded to the heat transferring layer bonding side 16a. In the embodiment shown, the strip 16' has a thickness of about 0.005 inch and a width of about 1.5 inches. Strips of other dimensions may be used without departing from the scope of the present disclosure.

In the embodiment shown, wrapping the heat transferring layer 16 around the first conduit 12 might allow the heat transferring layer to closely follow a shape of the first conduit 12 and might allow maximizing the heat transfer between fluids circulating within the first and second conduits 12, 14 while keeping the heat transferring layer 16 as an entity that is distinct from the first conduit to comply with regulations. In a particular embodiment, using a flat and thin strip of copper as the heat transferring layer 16 allows for easy manipulations and allows excellent metal to metal contact with the first conduit 12.

In the embodiment shown, to maximise a heat exchanging surface between the first and second conduits 12, 14, the second conduit 14 is a coiled tube and is disposed around the first conduit 12. Stated otherwise, the second conduit 14 is wrapped around both of the heat transferring layer 16 and the first conduit 12 such that the heat transferring layer 16 is disposed radially between the first conduit 12 and the second conduit 14 relative to a longitudinal axis L of the heat exchanger.

In the embodiment shown, a length of the second conduit 14 is greater than that of the first conduit 12. Therefore, a travel path of the fluid within the second conduit 14 is longer than that of the fluid circulating within the first conduit 12. Hence, more heat might be transferred between the fluids circulating in the conduits 12, 14 compared to a configuration where both the first and second conduits have the same length.

Referring now to FIGS. 2, 2a, and 2b, another embodiment of a heat exchanger is shown at 100. For the sake of conciseness, only elements that differ from the heat exchanger 10 of FIG. 1 are described below. In the embodiment shown, the heat exchanger second conduit 140 includes a plurality of tubes 140a disposed side-by-side to cover a whole circumference of the first conduit. As shown, each of the plurality of tubes 140a longitudinally extends along the longitudinal axis L and along the first conduit 12. It is understood that the plurality of tubes 140a need not be parallel to the first conduit 12 and that they may revolve around the longitudinal axis L so that a length of each of the plurality of tubes 140a is greater than that of the first conduit 12. As illustrated, each of the plurality of tubes 140a are bonded to the heat transferring layer 16.

In the embodiment shown, the heat exchanger 100 further includes a first manifold 18 for receiving fluid via an inlet 18a and for distributing the fluid in the plurality of tubes 140a. The first manifold 18 is located upstream of the plurality of tubes 140a relative to a flow direction D of the fluid circulating within the second conduit 14 and is in fluid flow communication with each of the plurality of tubes 140a of the second conduit 140.

As illustrated, the heat exchanger 100 further has a second manifold 20 located downstream of the second conduit 140 relative to the flow direction D and is in fluid flow communication with each of the plurality of tubes 140. The second manifold 20 is used to gather the fluid circulating within each of the plurality of tubes 140a and outputs flows circulating within the tubes 140a via an outlet 20a.

In the embodiment shown, joining pieces 22 are used to join each of the plurality of tubes 140a to the manifolds 18, 20. Stated otherwise, the joining pieces 22 creates an interface between the tubes 140a and the manifolds 18, 20 for limiting leaks. In the depicted embodiment, the joining pieces 20 are copper phosphorus brazing rings of the BCuP family. Any bonding suitable material can be used without departing from the scope of the present disclosure, such as a brazing wire and paste, soldering rings, or wire and paste.

Referring now to FIG. 3, a heat exchanger in accordance with another embodiment is shown at 200. For the sake of conciseness, only elements that differ from the heat exchanger 100 of FIG. 2 are described below. In the embodiment shown, the heat transferring layer 160 is a rectangular piece of material having a width selected to correspond to a circumference of the first conduit 12, and a height that corresponds to a height of the first conduit 12. The rectangular piece of material is wrapped around the first conduit 12 and its two longitudinal edges are joined together to form a joint line 160c. The joint line 160c may be created by a soldering process. Alternately, the joint line may be created by clamping together the edges such as to provide a tight fit engagement between heat transferring layer 160 and the first conduit 12.

Referring now to FIG. 4, a heat exchanger in accordance with another embodiment is shown at 300. For the sake of conciseness, only elements that differ from the heat exchanger 10 of FIG. 1 are described below. In the embodiment shown, the heat transferring layer 260 is a rectangular piece of material having a width selected to correspond to a circumference of the first conduit 12, and a height that corresponds to a height of the first conduit 12. The rectangular piece of material is wrapped around the first conduit 12 and its two longitudinal edges are joined together to form a joint line 260c. The joint line 260c may be created by a soldering process. Alternately, the joint line may be created by clamping together the edges such as to provide a tight fit engagement between heat transferring layer 260 and the first conduit 12.

In a particular embodiment, the thermal resistance between the heat transferring layer 16, 160, 260 and the first conduit 12 is far less than would be such a resistance between the first and second conduit 12, 14, 140 without the heat transferring layer 16, 160. Hence, in a particular embodiment, the heat transfer between the fluids circulating in the first and second conduits 12, 14, 140 is far superior to what could be achieved without the heat transferring layer 16, 160, 260 and without bonding the first conduit 12 to the second conduit 14, 140. Referring to all figures, to manufacture the heat exchanger 10, 100, 200, 300 the heat transferring layer 16, 160, 260 is disposed against the first conduit 12 to create the surface contact interface I between the heat transferring layer 16, 160 and the first conduit 12. The second conduit 14, 140 is bonded to the a surface of the heat transferring layer 16, 160 facing away from the first conduit 12 such that the heat transferring layer 16, 160 is monolithic with the second conduit 14. A thermal resistance defined between the second conduit 14, 140 and the heat transferring layer 16, 160, 260 is less than that across the surface contact interface I between the heat transferring layer 16 and the first conduit 12.

In the embodiment shown, bonding the second conduit 14, 140 to the bonding side 16a, 160a of the heat transferring layer 16, 160 is done by brazing the second conduit 14, 140 to the bonding side 16a, 160a of the heat transferring layer 16, 160.

Referring more particularly to FIG. 1, the heat transferring layer 16 is wrapped around the first conduit 12 and the second conduit 14 is wrapped around the heat transferring layer 16 and the first conduit 12.

Referring more particularly to FIGS. 2-3, the plurality of tubes 140a are disposed to be in contact against the heat transferring layer 16, 160 and each of the tubes 140a are bonded to the heat transferring layer 16, 160. In the embodiment shown, the upstream and downstream extremities of the plurality of tubes 140a are connected to the first and the second manifolds 18, 20, respectively. In the depicted embodiment, an assembly of the plurality of tubes 140a is clamped against the heat transferring layer 16, 160 and then joined using any joining method (e.g., soldering, brazing).

Referring to FIGS. 1-4, a solder paste is applied to one of the bonding side 16a, 160a of the heat transferring layer 16, 160 and the second conduit 14, 140. Then, the heat transferring layer 16, 160 is soldered to the second conduit 14, 140. Alternative joining methods may be used without departing from the scope of the present disclosure.

In a particular embodiment, a solder mask may be disposed within the gaps created between edges of the strip 16' when it is wrapped around the first conduit 12 to prevent solder from touching the first conduit 12 so that there is no solder on the wall 12a of the first conduit 12. The solder mask may be provided in the form of a tape or a liquid solder mask. Stated otherwise, the solder mask would be disposed in the gaps between spirals of the heat transferring layer 16.

Other configurations are contemplated. For instance, the second conduit may be annular and disposed around the first conduit, or the first and second conduit may be disposed adjacent to each other and separated by the heat transferring layer.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A heat exchanger extending along a longitudinal axis, comprising a first conduit configured for circulating a first fluid; a second conduit configured for circulating a second fluid; and a heat transferring layer disposed between the first conduit and the second conduit, the heat transferring layer being monolithic with the second conduit, an abutting side of the heat transferring layer in contact with the first conduit to define a surface contact interface therebetween, the abutting side shaped to correspond to a shape of a surface of the first conduit in contact with the heat transferring layer, a thermal resistance defined between the second conduit and the heat transferring layer being less than that across the surface contact interface between the heat transferring layer and the first conduit, the first conduit in heat exchange relationship with the second conduit via the heat transferring layer.

2. The heat exchanger of claim 1, wherein the second conduit is wrapped around the first conduit.

3. The heat exchanger of claim 1, wherein the heat transferring layer is a strip of material wrapped around the first conduit.

4. The heat exchanger of claim 1, wherein the heat transferring layer is made of copper.

5. The heat exchanger of claim 1, wherein the second conduit corresponds to a plurality of tubes longitudinally extending along the first conduit, each of the plurality of tubes being monolithic with the heat transferring layer.

6. The heat exchanger of claim 5, further comprising a manifold in fluid flow communication with each of the plurality of tubes for distributing the second fluid in the plurality of tubes.

7. The heat exchanger of claim 1, wherein the heat transferring layer is brazed to the second conduit.

8. A heat exchanger extending along a longitudinal axis, comprising a first conduit configured for circulating a first fluid; a second conduit configured for circulating a second fluid; and a heat transferring layer disposed between the first conduit and the second conduit, the heat transferring layer being monolithic with the second conduit, an abutting side of the heat transferring layer in contact with the first conduit to define a surface contact interface therebetween, the abutting side shaped to correspond to a shape of a surface of the first conduit in contact with the heat transferring layer, wherein an area of the surface contact interface is greater than a reference area, the reference area corresponding to an area of a reference surface contact interface between the second conduit and the first conduit if the second conduit were in direct contact with the first conduit without the heat transferring layer being present, the first conduit in heat exchange relationship with the second conduit via the heat transferring layer.

9. The heat exchanger of claim 8, wherein the second conduit is wrapped around the first conduit.

10. The heat exchanger of claim 8, wherein the heat transferring layer is a strip of material wrapped around the first conduit.

11. The heat exchanger of claim 8, wherein the heat transferring layer is made of copper.

12. The heat exchanger of claim 8, wherein the second conduit corresponds to a plurality of tubes longitudinally extending along the first conduit, each of the plurality of tubes monolithic with the heat transferring layer.

13. The heat exchanger of claim 12, further comprising a manifold in fluid flow communication with each of the plurality of tubes for distributing the second fluid in the plurality of tubes.

14. The heat exchanger of claim 8, wherein the heat transferring layer is brazed to the second conduit.

\* \* \* \* \*